Sept. 4, 1962 W. C. TRETHEWEY 3,052,877
MONITORING SYSTEM FOR MACHINES FOR PROCESSING MATERIALS
Filed March 21, 1957 3 Sheets-Sheet 1
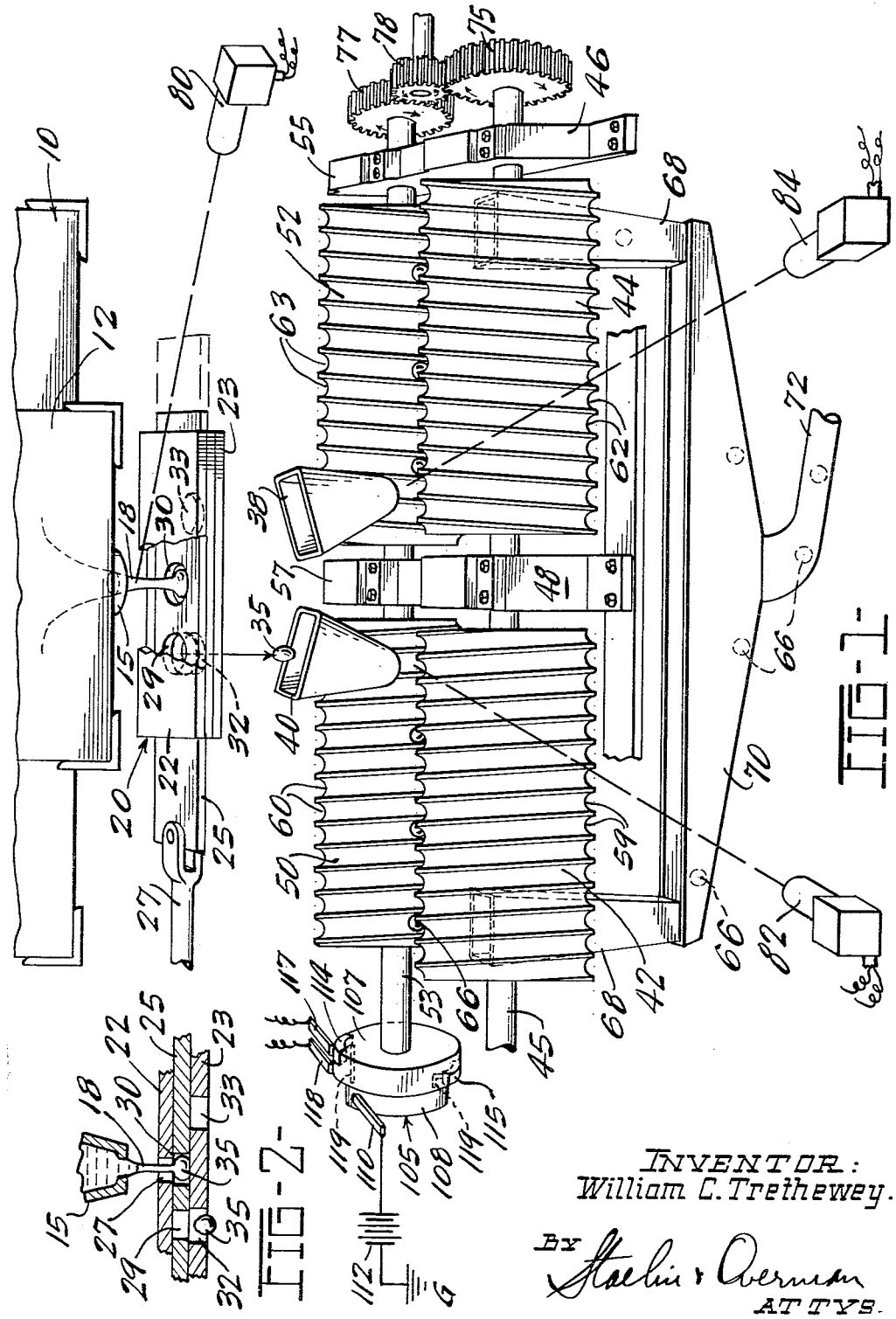
INVENTOR:
William C. Trethewey.
By
ATTYS.

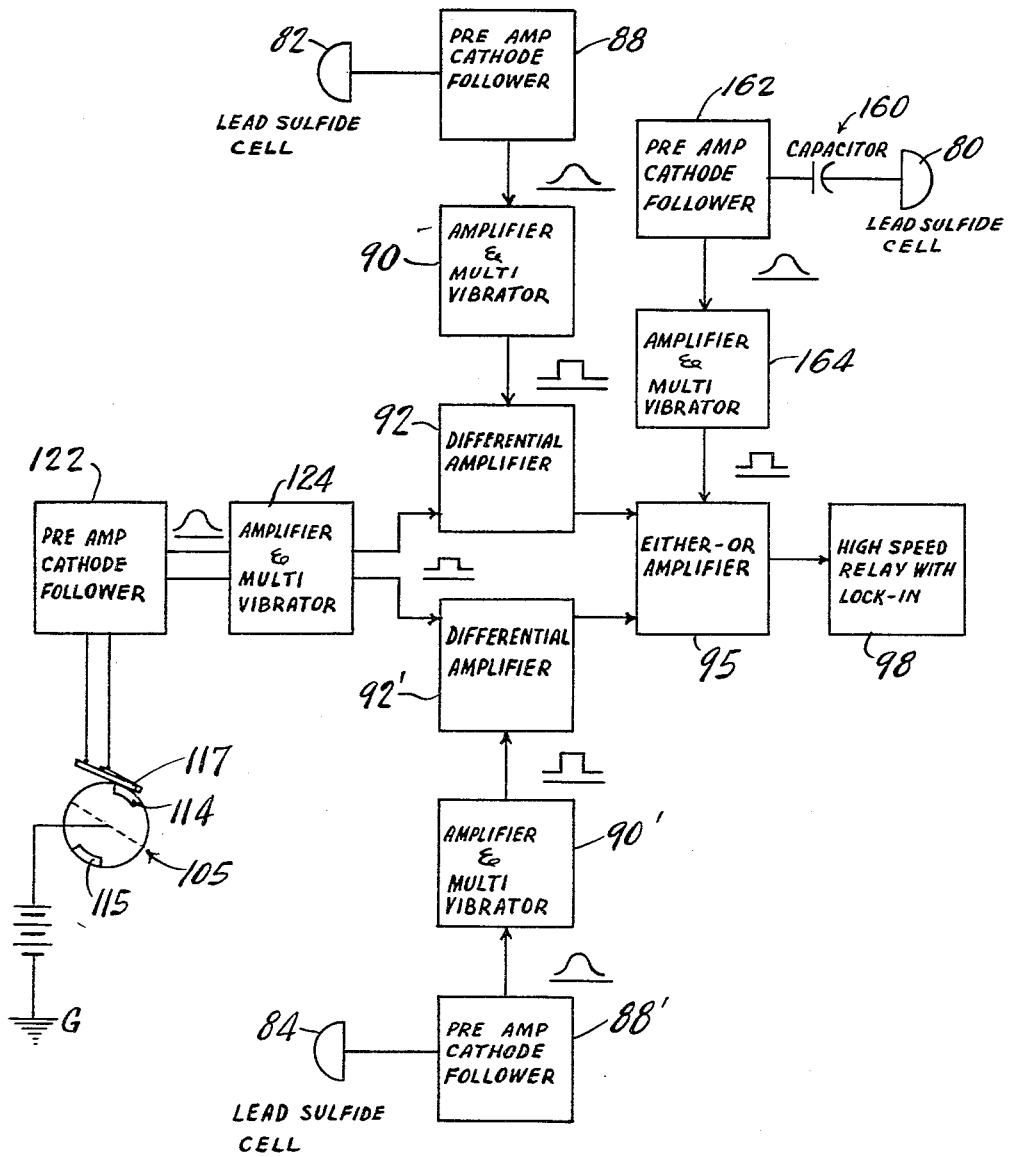
FIG-3-

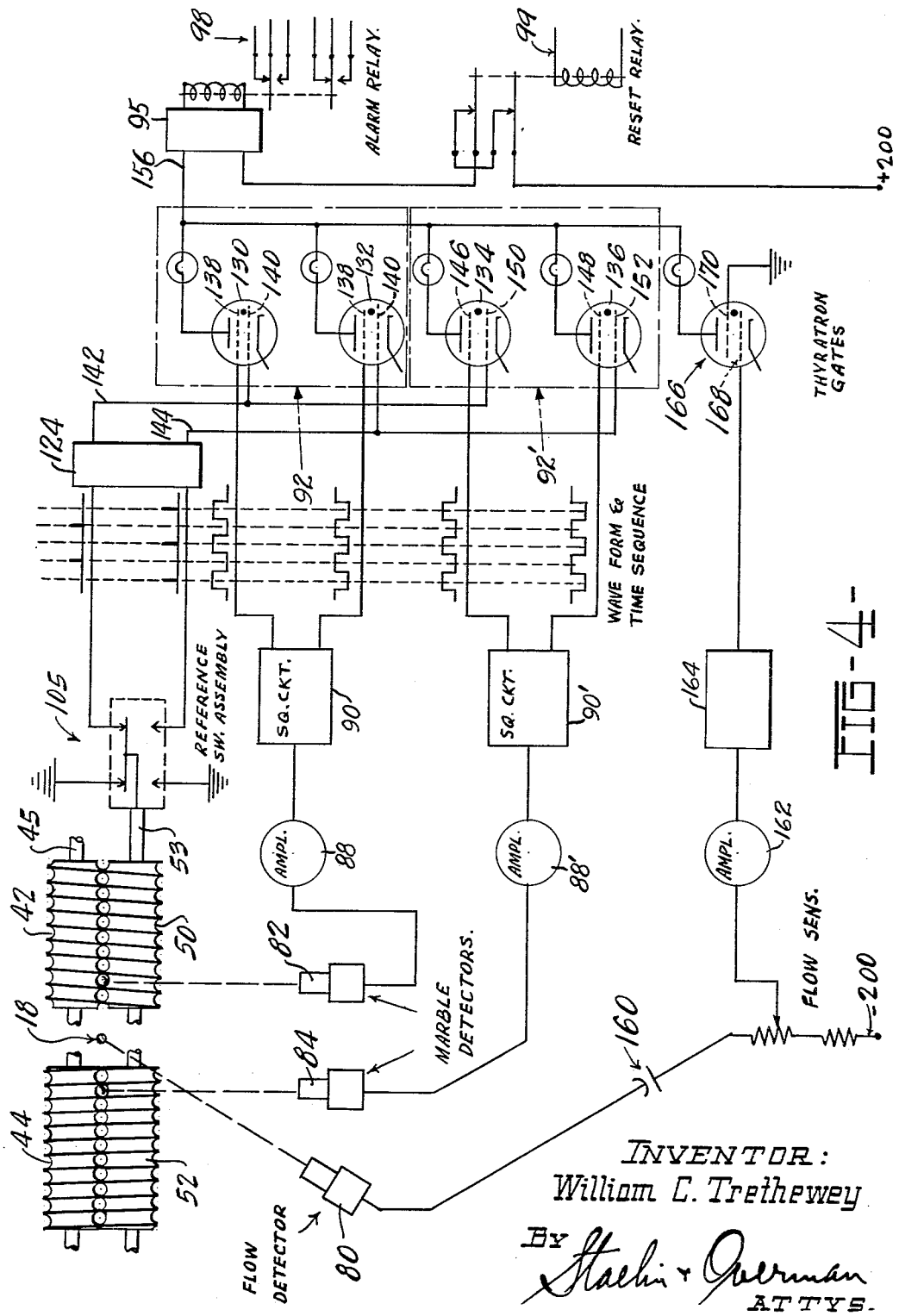

United States Patent Office 3,052,877
Patented Sept. 4, 1962

3,052,877
MONITORING SYSTEM FOR MACHINES FOR PROCESSING MATERIALS
William C. Trethewey, Newark, Ohio, assignor to Owens-Corning Fiberglas Corporation, a corporation of Delaware
Filed Mar. 21, 1957, Ser. No. 647,677
9 Claims. (Cl. 340—259)

This invention relates to an automatic monitoring system and method for use in machines for handling or processing materials and more especially to an automatic monitoring system and method for periodically sampling or indicating conditions of a machine for forming and processing glass bodies or the like severed from a stream.

In the manufacture of textiles from filaments or fibers of mineral materials, such as glass, the glass used for forming filaments or fibers must be highly refined in order to result in a glass which is free of bubbles, stria, and foreign matter and which is of homogeneous character. The melting and refining operations for producing a high quality glass for use in producing textile filaments is usually refined in comparatively large melting and refining furnaces to accomplish the purpose.

As such furnace equipment for refining large quantities of glass is very costly, it has been a practice to form the highly refined glass from a large furnace into spherical bodies or marbles which are then shipped or transported to textile plants where the glass marbles are reduced to molten condition in electrically heated feeders and the molten glass drawn or attenuated into fine filaments or fibers suitable for forming textiles and the like.

The marbles or spherical bodies must be of substantially the same diameters in order not to impair the operation of automatic means for delivering marbles as required into the melting feeder at the establishment where textile operations are being carried on. Hence, it is imperative that the size of the marbles which are formed from glass gobs severed from a glass stream be accurately controlled. Heretofore, a skilled operator had to constantly watch the glass stream and the forming apparatus or machine for any change in operating conditions or malfunctioning of the marble forming apparatus. As the forming apparatus is fully automatic and operating continuously, any change in condition of the glass stream, or malfunction of the gob severing or marble forming equipment not only results in interruption of the operation but in serious damage to the equipment.

The present invention embraces a method of and apparatus for monitoring or sampling the conditions of a material processing machine or apparatus for indicating any malfunction, change or impending change of operating conditions to enable the immediate correction of the malfunction or changed conditions.

Another object of the invention is the provision of a flow sensing arrangement associated with the stream of mineral material from which the bodies are formed for establishing an electrical impulse upon any modification or change in the size, character or direction of flow of the stream to actuate a signal to direct the operator's attention to the malfunction or abnormal condition.

Another object of the invention is the provision of an arrangement for monitoring the condition of a glass stream and the proper delivery of bodies of material severed from the glass stream whereby a signal is set into operation upon the initiation of an abnormal condition of the stream or improper delivery of severed bodies of material.

Another object of the invention resides in a method of and apparatus for automatically initiating the sampling of machine and operating conditions of a marble forming arrangement for instantly detecting and establishing a signal indicating a change or malfunction of the machine or operating conditions.

Still a further object of the invention is the provision of sensing means and circuits therefor arranged whereby the sensing means are influenced by changing conditions of monitored material or bodies whereby under normal and proper operation, electrical impulses are cancelled out or rendered ineffective but when influenced by an abnormal condition, an electrical impulse is transmitted to activate an alarm system.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

FIGURE 1 is a semidiagrammatic isometric view of an apparatus for forming spherically shaped bodies or marbles embodying an operating condition monitoring system and arrangement of the invention;

FIGURE 2 is a sectional view illustrating the gob forming and delivering mechanism;

FIGURE 3 is a block diagram showing the arrangement of sensing or detecting cells and amplifier means for conditioning electrical impulses for the operation of an alarm system, and FIGURE 4 is a circuit diagram of the condition sensing circuits and control means for activating an alarm or signal responsive to abnormal conditions monitored by the sensing devices.

While the monitoring system and method and associated components are illustrated for indicating machine or operating conditions of an apparatus for forming gobs or bodies of glass into marble or spherical formation, it is to be understood that utilization of the monitoring system, method and apparatus may be employed with other arrangements wherever the invention may be found to have utility.

Referring to FIGURE 1, there is illustrated a melting and refining furnace 10 in which glass batch or other mineral material is reduced to a flowable or molten state or condition. The furnace 10 is equipped with a forehearth 12 which receives refined molten material from the furnace 10. The furnace 10 is of substantial size and character so that the glass is fined and refined to provide a high quality of homogeneous glass suitable for use in forming fine filaments or fibers for textile use.

Disposed beneath the forehearth 12 is a feeder 15 formed with an orifice adapted to flow a stream 18 of glass or other molten or viscous flowable material. The material of the stream is in a highly viscous condition so that a gob or body of the material may be severed from the stream and maintained in a viscous, plastic condition for delivery into the marble forming dies.

The gob feeding and severing mechanism is illustrated in FIGURE 2. Disposed beneath the stream is a fixed member 20 formed with upper and lower plate portions 22 and 23 which are spaced vertically to accommodate a slidable gob cutter or severing member 25. The gob cutter 25 may be in the form of a plate which is adapted to be reciprocated by a rod 27 operated by suitable driving mechanism. The mechanism for reciprocating the gob cutter 25 is adapted for operation in timed or synchronized relation with the marble forming means which is arranged to receive the gobs or bodies of glass severed from the stream.

The upper member 22 is formed with a passage, opening or orifice 27 which accommodates the stream of material 18. The slidable gob severing member 25 is formed with two openings 29 and 30, shown in FIGURE 2, the openings being spaced longitudinally of the plate 25. The lowermost stationary plate portion or member 23 is formed with spaced openings 32 and 33 which are arranged for cooperative registration with the openings 29 and 30 formed in the plate 25.

The plate 25, as shown in FIGURE 2, is in a position with the opening 30 receiving the stream 18. When a predetermined quantity of glass of the stream is disposed in the opening 30, slidable movement of the plate 25 in a right-hand direction as viewed in FIGURES 1 and 2 severs a gob or body 35 from the stream and conveys the gob into registration with the opening 33 in plate 23.

The gob falls by gravity into a funnel or receiving duct 38 shown in FIGURE 1. Movement of the slide or gob severing plate 25 to the position noted above brings the opening 29 into registration with the stream 18 and a succeeding gob is formed in the opening 29. The slide 25 is then moved at the proper time in a left-hand direction bringing the gob into registration with the opening 32. The gob in the opening 29 falls by gravity into the funnel or duct 40 which is spaced from the duct 38.

Arranged beneath the forehearth are pairs of marble forming rolls. The rolls 42 and 44 are mounted upon a shaft 45 which is journalled in suitable bearings 46 at the end zones of the shaft, one of the bearings being shown in FIGURE 1. A bearing means 48 supports the shaft 45 at a region between the rolls. The rolls 50 and 52 are supported upon a shaft 53 which is journalled in suitable bearings at its end regions, one of the bearings 55 being illustrated in FIGURE 1, the region of the shaft between the rolls being supported upon bearing means 57.

The rolls are formed with peripheral arranged spiral recesses or grooves of substantially semicircular cross-section. The grooves 59 in the roll 42 and the grooves 60 in the adjacent roll 50 are spiraled in one direction, while the grooves 62 in the roll 44 and the grooves 63 in the roll 52 are spiraled in the opposite direction. The shafts 45 and 53 are arranged in parallelism and the recesses or grooves in the rolls are of uniform configuration throughout the length of the rolls.

A gob of glass 35 entering the funnel 40 is delivered into a pair of mating grooves 59, 60 and, as both rolls are continuously rotated in a clockwise direction, the gob of glass in the grooves is continuously rotated. Due to the spiral or pitch of the grooves, the gob 35 is continuously advanced at a uniform speed longitudinally of the rolls. As the plastic body or gob is being rotated as it traverses the rolls, it is gradually molded or shaped into spherical or marble formation and, by the time it has traveled to the end region of a set of rolls, it is cooled and becomes substantially solidified forming a marble or sphere 66.

Marble receiving chutes 68 are arranged adjacent the end region of each set of rolls, the formed marbles discharged from the ends of the rolls passing downwardly into a trough 70 and into a conveying channel 72 for delivery to a receiving zone. The marbles or spheres 66 in traversing the trough 70 and the channel 72 are further cooled so that by the time they are discharged from the channel 72 they are solid and not subject to deformation when they are delivered into a receiving bin or storage receptacle.

The marble forming rolls are driven by a motor (not shown) through suitable transmission mechanism to attain a desired speed of rotation for the rolls. The means driving the rolls is arranged to actuate the mechanism for reciprocating the gob severing means or plate 25 so that the stream severing or gob forming operations occur in timed relation with the speed of rotation of the marble forming rolls 42, 44, 50 and 52.

Thus the timing is established whereby at each one-half revolution of the rolls 42 and 50, a gob 35 is delivered into a pair of mating grooves thereof and when the rolls have moved through another one-half revolution, a succeeding gob is delivered into a pair of grooves of the rolls 44 and 52. Hence, at each revolution of the pairs of rolls, a gob is delivered between mating grooves of each set of rolls. The surfaces of the matched or mating grooves support and constantly rotate the gobs of glass to form marbles as the gobs are advanced toward the end regions of the sets of rolls.

As shown in FIGURE 1 the shaft 45 is equipped with a gear 75 and the shaft 53 is provided with a gear 77 of equal diameter. An intermediate or idler gear 78 is enmeshed with both gears 75 and 77 so that the shafts 45 and 53 both rotate at the same speed in clockwise directions.

The system, method and apparatus of the present invention involves monitoring the condition of the glass stream 18 and monitoring or sampling the conditions of the machine as to the uniformity of the severed gobs or bodies and their proper delivery from the gob severing station into the region of engagement of the gobs with the forming rolls.

The arrangement of the invention is adapted to provide an alarm or signal should there be any change in size or character of the glass stream or of bubbles formed in the glass stream, so that any deviation in the characteristics of the stream instantly activates a visual or audible signal or both to alert the operator to a malfunctioning condition, alerting the operator to remedy the condition before the malfunctioning or irregularity requires an interruption of the process. As the glass of the stream is in a highly viscous condition, any appreciable accumulation or piling up of the glass without proper disposition results in a freezing of the glass which may cause serious damage to the equipment and interruption of the marble forming process for an extended period of time.

The illustrated embodiment of the invention for indicating or sampling conditions of operation and conditions of the material stream involves electrical impulses generated or modified by both normal and abnormal operating conditions, the monitoring system being continuously operative to provide a signal indicating a malfunctioning or an abnormal condition.

The arrangement of the invention is inclusive of energy responsive means or sensing cells or units disposed in positions to monitor or detect the condition of the glass stream and to monitor the severing and delivery of gobs or bodies of glass into the forming rolls.

FIGURE 3 is a block diagram showing the components or instrumentalities of the monitoring system or arrangement. In the present embodiment the energy responsive or sensing means utilized are lead sulfide cells which are responsive to infra-red rays emanating from the hot glass stream or bodies severed therefrom.

The lead sulfide cell or sensing unit 80 as shown in FIGURE 1 is disposed to be influenced by changing characteristics of the glass stream 18. The sulfide cell 82 is arranged to monitor the timed and proper delivery of the glass gobs or bodies discharged into the funnel 40 and between the form rolls 42 and 50. The lead sulfide cell or sensing unit 84 is arranged to monitor the glass gobs or bodies delivered through the funnel 38 and between the forming rolls 44 and 52.

The amplifiers and components making up the monitoring circuit for the lead sulfide cell or condition responsive means 82 which monitors the delivery of glass bodies or gobs 35 to the forming rolls 42 and 50 are identical with the amplifiers and components included in the circuit of the monitoring cells or condition responsive means 84 which monitors the delivery of glass bodies or gobs to the forming rolls 44 and 52.

As shown in the block diagram of FIGURE 3, the lead sulfide cell 82 is connected with a preamplifier 88 of the cathode follower type, the output of the amplifying unit 88 being fed to an amplifier and multi-vibrator unit 90, the output of which is impressed in or received by a differential amplifier 92.

A direct current potential is established in the circuit of the lead sulfide cell 82 to provide for the transmission of electrical impulses impressed upon or established in the lead sulfide cell 82. The cell 82 scans or is focused upon a region in the path of movement of a gob or body 35 in its traverse from the severing means 25 to a position between mating spiral grooves of the forming rolls 42 and 50. The amplifier and multi-vibrator 90 translates electrical impulses from the cell 82 to square waveform which are fed through the differential amplifier 92 to an amplifier unit 95 which may be termed for purposes of this description an "either-or" amplifier, the function of which will be hereinafter explained.

The circuit of the sulfide cell or energy responsive means 84 is provided with direct current potential and electrical impulses from the cell 84 established by light energy from gobs or bodies of glass discharged from the severing means 25 into the mating grooves of the forming rolls 44 and 52 are fed into a pre-amplifier and cathode follower 88'. The output of the amplifying unit 88' is transmitted to an amplifier and multi-vibrator unit 90' wherein the electrical impulses are translated into square waveform and are passed through a differential amplifier 92', the output thereof being received in the amplifier 95. The output of the amplifier 95 which is established or set up only by abnormal conditions pertaining to the delivery of the gobs of glass 35 to the forming rolls, is arranged to activate an alarm or signal relay 98 of the "lock-in" type.

The alarm relay 98 may be arranged to activate an audible signal such as a buzzer, bell or other audible sound producing means or to energize a signal lamp. The relay may be arranged to activate or energize both forms of signals for the purpose of indicating to the operator that a malfunction or abnormal condition has occurred in the operation of the delivery of gobs of glass 35 into the forming rolls.

The lead sulfide cells 82 and 84 are so disposed that a gob of glass 35 moving through the area scanned by the cell sets up an electrical impulse which moves through the amplifying units in the sequence hereinbefore mentioned.

The sensing arrangement or monitoring system is inclusive of a means functioning in synchronism or timed relation with the condition responsive impulses set up through the medium of the lead sulfide cells 82 and 84. In the embodiment of the invention illustrated, this means is dependent for its operation and functioning upon a moving element or component rotated or operated by means driven or rotating at a uniform speed. For purposes of this description this means is referred to herein as a reference switch means or assembly. Its purpose is to establish electrical impulses normally synchronized or timed with electrical impulses set up in the circuits of the condition responsive cells 82 and 84 to prevent the activation of the alarm system so long as normal operating conditions obtain in the gob delivery and marble forming phases performed by the apparatus and arrangement shown in FIGURE 1. The reference switch assembly or unit is illustrated at 105 in FIGURE 1, 2 and 3 of the drawings.

The reference switch unit 105 is illustrated diagrammatically in FIGURE 1 and includes a rotor 107 which may be mounted upon a shaft 53 of the forming roll 50 and driven thereby at the same speed as the roll 50. The member 107 is formed of non-conducting material such as molded nylon, formica or the like which is equipped with a current conducting ring or collector 108. A current conducting brush or member 110 is connected with a source of direct current potential 112 thence to a ground connection identified at G. The brush or member 110 continuously contacts the current conducting ring 108 so that there is a constant direct current potential on the ring 108.

A peripheral region of the non-conducting member 107 is equipped with a segment or contact 114, and diametrically opposite to the segment 114 but out of transverse registration therewith is a second segment 115. A contact member or brush 117 is arranged in contact with a peripheral region of member 107 and in the path of the segment 114 so that at each revolution of the member 107 a contact is established between the brush 117 and the segment 114. A second brush 118 contacts the periphery of member 107 in a path so that at each revolution of the member 107 contact is established between the brush 118 and the second segment 115. Each of the segments is connected by a suitable conductor 119 with the current conducting ring 108.

The member 107 is driven by shaft 53 and the segment 114 is positioned with respect to the form roll 50 so that at the moment the segment 114 is in contact with the brush 117, the glass gob 35 falling into the funnel 40 moves past the region scanned by the cell 82. Hence at that instant an electrical impulse is set up in the monitoring circuit of the lead sulfide cell 82 caused by infrared rays from the moving gob 35, the impulse being fed to the pre-amplifier cathode follower 122 in the block diagram of FIGURE 3.

The electrical impulse from the amplifying unit 122 becomes the input of an amplifier and multi-vibrator component 124, the latter unit translating the electrical impulse into square waveform for transmission to the differential amplifier 92. When the member 107 has rotated one-half revolution or 180°, the segment 115 contacts the brush 118 establishing a second circuit to the amplifying unit 122 which becomes the input amplifier and multi-vibrator unit 124 which translates the impulse into square waveform and which becomes the input to the differential amplifier 92'.

Under normal operating conditions the electrical impulse, fed through amplifier 124 to the differential amplifier 92' is timed or synchronized exactly with the electrical impulse set up in the circuit of the lead sulfide cell 84 which is transmitted to the differential amplifier 92'. Under normal conditions of operation of the gob delivering means, the impulses established through the circuits of the reference switch mechanism 105 cancel, counteract or nullify the impulses established through the lead sulfide cells 82 and 84 so that no activation of a signal takes place until some abnormality or malfunction occurs.

FIGURE 4 is further illustrative of the circuit details of certain of the components shown in FIGURE 3. The arrangement is inclusive of electronic means for gating the square waveform electrical impulses to control the activation of the alarm relay 98 to provide a signal indicating malufunctioning or abnormal operating conditions.

The circuit of the lead sulfide cell 82 through its amplifiers and the output of the reference switch arrangement 105 are connected with thyratron tubes 130 and 132 which form gates effective during normal operating conditions to prevent the activation of the alarm relay 98 but which are rendered effective to activate the alarm relay 98 upon the occurrence of an abnormal condition or mulfunctioning of the gob feeding or marble forming apparatus.

A second circuit of the reference switch assembly and the circuit of the lead sulfide cell 84 and its impulse amplifying components includes thyratron tubes 134 and 136 which serve the same purpose in the circuit of the cell 84 as the tubes 130 and 132 in the circuit of the cell 82. Each of the thyratron tubes 130 and 132 includes two control grids 138 and 140. The output circuits of the amplifier and multivibrator 90 are connected with the control grids 138 in tubes 130 and 132 of the differential amplifier 92.

A circuit 142 of the reference switch assembly 105 is completed by contact of segment 114 with the brush 117 to the control grid 140 of tube or gate 130, while the circuit 144 is completed through contact of the segment 115 of the reference switch 105 with the brush 118 with the control grid 140 in the tube or gate 132.

The circuit associated with the reference switch 105, which provides reference signals for correlation with the signals provided by the monitoring cell 84, is of the same character as the circuit providing reference signals for the monitoring cell 82. The outputs of the amplifying circuits for the lead sulfide cell 84 are connected respectively to the control grid 146 of tube 134 and control grid 148 of tube 136. The circuit 142 of reference switch 105 is connected with control grid 150 of the tube 134 and the second circuit 144 of the reference switch 105 is connected with control grid 152 of tube 136. A direct current potential is established in the circuit 156 of the anode elements in the several thyratron tubes.

The thyratron tube characteristics as used in the present instance are normally nonconducting except when they are fired or triggered through an electrical impulse of square waveform impressed on one or the other of the control grids in each of the tubes. If impulses are fed to the control grids of a tube simultaneously, the tube will not be triggered or fired as the impulses are of a character to oppose and therefore cancel each other. In the present invention this characteristic is utilized for controlling an alarm or signal in connection with the delivery of gobs of glass 35 from the severing means into the forming rolls.

As the circuits and components intercalated with the monitoring cell 82 and their functioning in connection with the delivery of gobs of glass to the forming rolls 42 and 50 are identical with the circuits and components associated with the monitoring cell 84 for monitoring operating conditions involving delivery of glass gobs 35 to the forming rolls 44 and 52, an explanation and description of the various functions of reference switch 105 and the thyratron gates 130 and 132 and the circuits therefor will suffice.

The operation of the monitoring system through the circuit of cell 82 and reference switch 105 when operating conditions of the gob severing and delivering means are normal is as follows: Assuming that a gob of glass 35 is falling or traversing a vertical or defined path from the opening 32 in the plate 23 of the severing mechanism into the funnel 40 for delivery into a pair of mating spiral grooves in the forming rolls 42 and 50, the cell 82 is arranged to scan or be targeted upon a field or region in the path of the moving gob 35.

The gob of glass 35 in plastic or highly viscous condition emits a red glow and the lead sulfide cell 82 is responsive to the energy of infra-red rays emanating from the intensely hot gob of glass. At the instant that the gob 35 passes the scanned or targeted region monitored by the cell 82, an electrical impulse is set up in the circuit of the cell 82 which is fed through the components or amplifiers 88, 90 and 92 indicated in the block diagram FIGURE 3, the impulses being translated to square waveform for triggering or firing the thyratron gate or tube 130 if the impulse is not counteracted or cancelled.

Simultaneously with the impulse generated by the gob detector or cell 82, the member 107 driven by the forming roll 50 is in a position establishing a circuit through the segment 114 and brush 117, shown in FIGURE 1, to set up or establish an impulse in circuit 142, shown in FIGURE 4, which impulse in square waveform is communicated to the control grid 140 of tube 130 to gate the tube on. At the same time, the impulse simultaneously impressed on the control grid 138 gates the tube off.

Hence, the simultaneous impulses in the control grids 138 and 140 exactly counteract or cancel each other so that no output impulse is set up in circuit 156 to the alarm relay 198 and no signal is given. The foregoing is the normal condition existent when the glass gobs are being delivered at the proper time and in proper sequence. This sampling of the operating conditions takes place with the formation and delivery of each gob.

In the event that a glass gob 35 fails to pass the scanned region monitored by the cell 82 no impulse will be set up effective on the control grid 138. However, the reference switch arrangement 105 through its mechanical operation under the influence of rotation of the forming roll 50 establishes an impulse in the circuit 142 effective on the control grid 140 of tube 130 to gate or fire the tube 130 "on."

As there is no counteracting impulse on the control grid 138, the tube 130 is triggered or fired setting up an impulse in the circuit 156 which energizes the alarm relay 98 to activate or actuate a signal of either audible or visual character or both as desired. The signal alerts the operator that an abnormal condition or malfunctioning exists which requires immediate correction.

The tube or gate 132 is for the purpose of activating the alarm system in the event of delivery of a fragment of a gob out of synchronism with the normal timed deliveries of gobs 35 to the forming rolls.

Assuming that a portion of a gob passes the scanned region monitored by the cell 82 at the proper period in synchronism with the impulse establishing condition of the reference switch 105, the electrical impulses on the control grids 138 and 140 cancel each other and no alarm signal is activated.

Assuming that a fragment of a gob moves past the scanned area of the cell 82 out of synchronism with the reference switch impulse forming means 105, such abnormal condition causes an electrical impulse of square waveform from the cell 82 to be impressed upon the control grid 138 of the tube 132. As this impulse on the control grid 138 is not counteracted or cancelled by an impulse through the reference switch circuit, the tube 132 is "gated on" as the impulse on the control grid 138 fires or triggers the tube 132 to activate the alarm relay and signal means associated with the tube through the circuit 156.

The conditions and functions of the circuits through the cell 84 and tubes 134 and 136 monitoring the operating conditions in reference to the delivery of gobs of glass 35 to the form rolls 44 and 52 and the reference switch 105 setting up periodic impulses which are transmitted to the tubes 134 and 136 are the same as hereinbefore described with respect to the monitoring system of the cell 82.

The lead sulfide cell 80 and components associated therewith provide a monitoring means or method for detecting any variation or change in the size and flow characteristics of the glass stream or an interruption of the stream. With particular reference to FIGURES 3 and 4, the lead sulfide cell is disposed to continuously scan or target the glass stream 18.

The circuit of the cell 80 includes a capacitor 160 which is connected with a preamplifier and cathode follower 162, the output of which is fed to an amplifier and multivibrator 164, the output impulse of square waveform being fed to the "either-or" amplifier 95. A suitable direct current potential is impressed in the circuit of the cell 80. The circuit includes a thyratron tube or gate 166 which is provided with a control grid 168, a second control grid 170 of the tube being grounded. The anode of the thyratron gate 166 is in circuit 156 with the alarm relay 98.

The operation of the cell 80 and its associated components monitoring the condition of the glass stream 18 is as follows: A constant direct current potential is set up in the circuit of the cell 80. If a change or variation occurs in the size or characteristics of the glass stream 18, the cell 80 is responsive to such variations or changes and sets up an electrical impulse which passes through the capacitor 160 and through the amplifying units to the control grid 168 of the tube 166.

If the stream 18 maintains constant size and flow characteristics without bubbling or wavering, no electrical impulse is transmitted to fire or trigger the thyratron gate 166. Any variaton in the size of the stream 18 or wavering or bubbling of the stream modifies energy of the infra-red rays projected into the flow detector or lead sulfide cell 80 and sets up an electrical impulse which passes through the capacitor 160, is amplified, oriented to square waveform by the multivibrator 164, and transmitted to the control grid 168 to fire or trigger the gate 166 to actuate the alarm relay 98 and activate the visual or audible alarm or both, as may be desired. The relay circuit is inclusive of a resetting relay 99 for releasing the alarm relay to reset the alarm system or circuit.

While it has been found that lead sulfide cells are especially adaptable as a monitoring means responsive to variations in the characteristics or conditions of molten mineral material and responsive to conditions of apparatus for working molten materials, it is to be understood that other energy responsive means may be employed for monitoring the conditions and initiating an alarm or signal when the stream characteristics or operating conditions of the machine are impaired or modified. The method and apparatus of the invention as pointed out provides a monitoring system which effectively, automatically and continuously samples machine conditions for detecting and signaling faulty operation or malfunctioning by pulse monitoring a stream of molten material and the handling or disposition of bodies of the material derived from the stream.

In the embodiment illustrated, a gob or body 35 is delivered to each set of marble forming rolls at each revolution of the rolls although successive gobs or bodies are alternately directed to the sets of rolls. It is to be understood that the reference switch assembly 105 may be of different character such as a magnetic "pick up" device for establishing electrical impulses in timed relation with the rotation of the forming rolls.

It is apparent that, within the scope of the invention, modifications and different arrangements may be made other than is herein disclosed, and the present disclosure is illustrative merely, the invention comprehending all variations thereof.

I claim:

1. A system for monitoring operations of an apparatus for forming discrete bodies from a stream of molten material wherein succeeding bodies of the material are severed from the stream including a stream sensing circuit, a body sensing circuit, a reference circuit, means dependent upon a moving component of the apparatus to produce electrical impulses intermittently at uniform time intervals, means in the body sensing circuit responsive to movement of a body through a defined region to set up an electrical impulse normally in phase with the impulse in the reference circuit, control means for the impulses, signal means, said control means being arranged to energize the signal means when the impulses are out-of-phase, and means in said stream sensing circuit responsive to changes in the characteristics of the stream to energize the signal means.

2. An arrangement for sampling conditions of operation of apparatus for processing a stream of molten material having rotatable rolls for working bodies of the material severed from the stream including, in combination, means responsive to a moving body adapted to initiate an electrical impulse, a second means responsive to rotation of the rolls for initiating an electrical impulse, said electrical impulses being normally in phase, a signal circuit, gating means associated with the signal circuit arranged to be influenced by said electrical impulses, said gating means being adapted to prevent activation of the signal producing circuit when said impulses are in phase and to effect energization of the signal circuit upon variation in the phase condition of the electrical impulses.

3. An arrangement for sampling conditions of operation of apparatus for processing a stream of molten material having rotatable rolls for working bodies of the material severed from the stream including, in combination, means responsive to a moving body adapted to initiate an electrical impulse, means for translating the impulse to square waveform, a second means responsive to rotation of the rolls for initiating an electrical impulse, said electrical impulses being normally in phase and adapted to cancel each other, a signal producing circuit, gating means in said signal producing circuit arranged to be influenced by uncancelled electrical impulses, said gating means being adapted to transmit an uncancelled electrical impulse resulting from an abnormal operating condition to the signal producing circuit to activate a signal.

4. An arrangement for monitoring the delivery of gobs of material to an apparatus embodying gob-working rolls including, in combination, energy responsive means targeted upon a region in the path of traverse of gobs delivered to the gob-working rolls adapted to initiate an electrical impulse with the passage of each gob, means operated in synchronism with the rolls for periodically setting up electrical impulses, said impulses set up by the means synchronized with the rolls being in phase with the impulses set up by the moving gobs under normal operating conditions, said impulses being of a character to cancel each other and prevent activation of the alarm system and to effect activation of the alarm system upon failure in the phase relation of the impulses.

5. An arrangement for monitoring the delivery of gobs of material to an apparatus embodying rotatable gob-working members including, in combination, a lead sulfide cell targeted upon a region in the path of traverse of gobs moving into engagement with the gob-working members, an alarm system, said cell being adapted to set up an electrical impulse with the passage of each gob, means operated in synchronism with the gob-working members for periodically setting up electrical impulses, said impulses set up by the means synchronized with the rotatable members being in phase with the impulses set up by the moving gobs under normal operating conditions, and gating means adapted to prevent transmission of impulses to the alarm system when the impulses are in phased relation and to transmit an impulse to the alarm system upon failure of the phase relation of the impulses.

6. An arrangement for monitoring a stream of molten glass and gobs severed therefrom in a marble forming apparatus embodying rotatable marble forming rolls including, in combination, an energy responsive cell targeted upon the glass streams, an energy responsive cell targeted upon a region in the path of traverse of gobs moving into the marble forming rolls, an alarm system, said cell targeted upon the glass stream being adapted to set up electrical impulses to activate the alarm system upon variation in the characteristics of the stream, means operated in synchronism with the forming rolls for periodically setting up electrical impulses, said cell targeted upon the region of traverse of the gobs being adapted to set up an electrical impulse by each gob moving through the targeted region, said impulses set up by the means synchronized with the forming rolls being in phase with the impulses set up by the moving gobs under normal operating conditions and arranged to cancel each other to prevent activation of the alarm system and means for transmitting an impulse to activate the alarm system upon impairment of the normal phase relation of the impulses.

7. An arrangement for monitoring gobs of material delivered to forming apparatus embodying rotatable forming rolls including, in combination, an alarm system, a gob detector targeted upon the path of movement of a gob into engagement with the forming rolls to generate an electrical impulse with the passage of each gob, a pair of gating tubes, electrical instrumentalities in circuit with said gob detector and said pair of gating tubes for amplifying and translating the electrical impulses into square waveform which are fed to the gating tubes, means operated in synchronism with the forming rolls arranged to periodically supply electrical impulses to said pair of gating tubes, the electrical impulses set up by the gob detector being in phase with the electrical impulses established by the means operated in synchronism with the forming rolls being fed to the gating tubes and rendered ineffective to activate the alarm system under normal conditions of delivery of the gob to the forming rolls, said gating tubes being rendered effective by an abnormal condition affecting gob delivery to transmit an impulse to activate the alarm system.

8. An arrangement for monitoring a stream of molten glass and delivery of gobs severed therefrom in a marble forming apparatus embodying rotatable marble forming rolls including, in combination, a flow detector targeted upon the glass stream, an alarm system, a gating tube in circuit with the flow detector and the alarm system, said flow detector being responsive to variations in the characteristics of the glass stream adapted to set up electrical impulses caused by said variations in the stream to trigger the gating tube and thereby activate the alarm system, a gob detector targeted upon the path of movement of a gob formed from the stream into engagement with the forming rolls to generate an electrical impulse with the passage of each gob, a pair of gating tubes, electrical instrumentalities in circuit with said gob detector and said pair of gating tubes for amplifying and translating the electrical impulses into square waveform which are fed to the gating tubes, means operated in synchronism with the forming rolls arranged to periodically supply electrical impulses to said pair of gating tubes, the electrical impulses set up by the gob detector being in phase with the electrical impulses established by the means operated in synchronism with the forming rolls, said impulses being fed to the gating tubes and normally ineffective to activate the alarm system under normal conditions of delivery of gobs to the forming rolls, said tubes being arranged to transmit an impulse to activate the alarm system upon the occurrence of an abnormal condition affecting gob delivery to the rolls.

9. An arrangement for monitoring a stream of molten glass and gobs severed therefrom in a marble forming apparatus embodying rotatable marble forming rolls including, in combination, a flow detector targeted upon the glass stream, an alarm system, a gating tube in circuit with the flow detector and the alarm system, amplifying means between the flow detector and the gating tube, said flow detector being responsive to variations in the characteristics of the glass stream adapted to set up electrical impulses caused by said variations in the stream to trigger the gating tube and thereby activate the alarm system, a gob detector targeted upon the path of movement of a gob formed from the stream into engagement with the forming rolls to generate an electrical impulse with the passage of each gob, a pair of gating tubes, electrical instrumentalities in circuit with said gob detector and said pair of gating tubes for amplifying and translating the electrical impulses into square waveform which are fed to the gating tubes, means operated in synchronism with the forming rolls arranged to periodically supply electrical impulses to said pair of gating tubes, the electrical impulses set up by the gob detector being in phase with the electrical impulses established by the means operated in synchronism with the forming rolls said electrical impulses being cancelled in the gating tubes and thereby rendered ineffective to activate the alarm system under normal conditions of delivery of the gob to the forming rolls, said tubes being of a character whereby an uncancelled electrical impulse triggers a gating tube to activate the alarm system upon phase failure of the impulses.

References Cited in the file of this patent

UNITED STATES PATENTS

| | | |
|---|---|---|
| Re.22,709 | Russell | Jan. 15, 1946 |
| 1,880,916 | Early | Oct. 4, 1932 |
| 1,951,426 | Littler | Mar. 20, 1934 |
| 2,171,362 | Gulliksen | Aug. 29, 1939 |
| 2,295,366 | Stout | Sept. 8, 1942 |
| 2,487,797 | Friedman et al. | Nov. 15, 1949 |
| 2,493,543 | Merchant | Jan. 3, 1950 |
| 2,731,621 | Sontheimer | Jan. 17, 1956 |
| 2,808,580 | Fuller | Oct. 1, 1957 |